United States Patent [19]

Nöetzel et al.

[11] Patent Number: 4,487,655
[45] Date of Patent: Dec. 11, 1984

[54] PROCESS OF AND COMPOSITION FOR DE-INKING WASTE PAPER AS WELL AS PAPER RECLAIMED BY SAID PROCESS

[75] Inventors: Siegfried Nöetzel, Wilhelmsfeld; Margarete Scholl, Mannheim; Heinz Ballreich, Neulussheim, all of Fed. Rep. of Germany

[73] Assignee: Benckiser-Knapsack GmbH, Ladenburg, Fed. Rep. of Germany

[21] Appl. No.: 597,215

[22] Filed: Apr. 6, 1984

Related U.S. Application Data

[63] Continuation of Ser. No. 384,926, Jun. 4, 1982, abandoned.

[30] Foreign Application Priority Data

Jun. 10, 1981 [DE] Fed. Rep. of Germany ....... 3122911

[51] Int. Cl.$^3$ ............................................. D21C 5/02
[52] U.S. Cl. .......................................... 162/5; 162/6; 162/8; 162/78; 162/80
[58] Field of Search ........................ 162/5, 6, 8, 78, 80

[56] References Cited

U.S. PATENT DOCUMENTS

| 3,860,391 | 1/1975 | Kling et al. | 8/111 |
| 4,056,430 | 11/1977 | Hoeger et al. | 162/76 |
| 4,347,099 | 8/1982 | De Ceoster et al. | 162/78 |
| 4,381,969 | 5/1983 | De Cuester et al. | 162/5 |
| 4,390,395 | 6/1983 | De Cuester et al. | 162/5 |

FOREIGN PATENT DOCUMENTS

| 13027 | 7/1980 | European Pat. Off. | 162/5 |
| 0040873 | 12/1981 | European Pat. Off. | |
| 2408523 | 11/1976 | Fed. Rep. of Germany | |
| 2211578 | 4/1980 | Fed. Rep. of Germany | |
| 52-70102 | 6/1977 | Japan | 162/78 |

OTHER PUBLICATIONS

Lachenal et al., "Hydrogen Peroxide as a Delignifying Agent", TAPPI, vol. 63, No. 4, pp. 119-122, (Apr. 1980).
Abstract of Stettler, "Special Problems in De-inking Waste Paper", 1004 Abstract Bulletin of the Institute of Paper Chemistry, vol. 50, No. 11, p. 1108, (May 1980) and No. 10355 Appleton, Wisconsin.
Lachenal, D. et al., "Hydrogen Peroxide Association of the Pulp and Paper Industry, vol. 63, No. 4, Apr. 1980, p. 119.
Pfalzer, L., "Deinking of Secondary Fibers," TAPPI Journal of the Technical Association of the Pulp and Paper Industry, vol. 63, No. 9, Sep. 1980, p. 113.

Primary Examiner—William Smith
Attorney, Agent, or Firm—Schwartz, Jeffery, Schwaab, Mack, Blumenthal & Koch

[57] ABSTRACT

The novel, advantageous, and economical process of reclaiming printed waste paper comprises subjecting waste paper to a flotation de-inking process. The degree of whiteness of the reclaimed paper is considerably increased by the addition of specific phosphonic acid compounds to the de-inking bath. Hydroxy carboxylic acids, amino carboxylic acids, polycarboxylic acids as well as magnesium sulfate may also be added to the de-inking bath containing the phosphonic acids.

4 Claims, No Drawings

PROCESS OF AND COMPOSITION FOR DE-INKING WASTE PAPER AS WELL AS PAPER RECLAIMED BY SAID PROCESS

This application is a continuation of application Ser. No. 384,926, filed June 4, 1982; now abandoned.

BACKGROUND OF THE INVENTION

1. Field of the Invention

The present invention relates to a novel, advantageous and economic process of upgrading waste paper and especially printed waste paper by means of a flotation de-inking process so as to remove therefrom the printing ink or other printing matter, to de-inking compositions and baths used in said process, and to reclaimed waste paper upgraded by said process.

2. Description of the Prior Art

In view of the ever increasing world-wide scarcity in wood supply and the continuously increasing energy costs, upgrading and re-using of waste paper has attained greater and greater importance. Yet an increase in the use of reclaimed waste paper is highly dependent on an improvement in the quality of the reclaimed waste paper, more particularly an improvement of its optical properties, i.e. of its degree of whiteness. To regenerate said valuable raw material, there have been developed de-inking processes which have been used extensively in industry during the last decades. The washing and flotation process for the separation of the printing ink particles from the suspension of fibers and filler materials in the waste paper pulp has proved to be of special value. Said flotation de-inking process is described, for instance, in "DAS PAPIER", vol. 10 A, (1961), pages 546 to 554. This process is based on the differences in wettability of the printing ink particles to be removed from the fiber suspension, and the fiber particles. When carrying out this process, one must attempt to separate and remove the printer's ink as thoroughly as possible. This effect and result are achieved by loosening and separating the printing ink particles from the fiber material by means of suitable chemical agents and causing them to float by introducing air into the suspension. Alkali metal salts of fatty acids, surfactants, such as, for instance, ethoxylated fatty acids or alkyl phenyl sulfonates, which, conventionally act as dispersing agents, as well as complex compound-forming agents, such as ethylene diamine tetraacetic acid are used as flotation aids. Alkali metal peroxides, such as sodium peroxide, or, respectively, hydrogen peroxide and alkali metal hydroxide solutions, such as sodium hydroxide solution, and waterglass as stabilizer for the peroxide are also added as chemical de-inking agents. A suitable de-inking composition thus may be composed as follows:

| | |
|---|---|
| Sodium peroxide or hydrogen peroxide | 1.0%–2.0%, |
| waterglass | 1.0%–5.0%, |
| fatty acid | 0.6%–1.2%, |
| complex compound-forming agents such as ethylene diamine tetra-acetic acid | 0.2%–0.4%, |
| sodium hydroxide | 0.0%–2.0%, |
| dispersing agent | 0.1%–0.2%. |

The manner in which the known de-inking process is carried out is described in numerous literature references. The following articles may be mentioned as examples:

Bechstein, G. "Der Deinking-Flotationsprozess, ein modernes Verfahren der Altpapier-Aufbereitung" (The de-inking process, a modern procedure for reclaiming waste pater), published in "Zellstoff und Papier" vol. 22 (1973), No. 11, pages 337–339;

Ortner, H., Wood, R. F., Gartemann, H. "Deinking—Stand Entwicklung" (De-inking—status and development) published "Wochenblatt fuer Papierfabrikation", No. 16, pages 597–601;

Weidhaas, A. G. "Erfahrungen mit einer De-inking-Anlage zur Erzeugung von Zeitungsdruckpapier" (Experiences with a de-inking plant for producing newsprint paper) published in "Wochenblatt fuer Papierfabrikation" vol. 104 (1976), No. 22, pages 857–865; and Schlaepfer, K., Faessler, U., Kueng, P. "Der Einfluss der Druckfarbe beim Deinking von Zeitungspapier" (The influence of the printing ink on the de-inking of paper used for newsprint paper), "UGRA-Auftrag 68" (UGRA Order 68), UGRA: Verein zur Foerderung wissenschaftlicher Untersuchungen im graphischen Gewerbe, 1974, St. Gallen.

When carrying out the known processes, there are encountered considerable difficulties which are caused by the addition of waterglass added as stabilizing agent for the peroxide. Silicate deposits precipitate in the pipelines of the de-inking system and also in the sieves, felts, and calenders of the paper machine. The de-inked paper pulp or slurry to which waterglass has been added, also causes trouble on the paper machine during dewatering or drying, because waterglass reduces very considerably the action of retention affecting agents and of dewatering accelerators. The waste water from the de-inking plant can be clarified and purified only with difficulty by the addition of flocculating agents due to its high content of waterglass. Another disadvantage of the heretofore used de-inking processes resides in the fact that the paper pulp to which waterglass has been added, yields reclaimed paper which shows losses in strength and tends to turn yellowish.

SUMMARY OF THE INVENTION

It is one object of the present invention to provide a simple, highly effective, and economical process of de-inking by flotation waste paper and especially newsprint waste paper, which process avoids to a considerable extent the disadvantages of the heretofore used processes and which yields reclaimed paper of a superior degree of whiteness and satisfactory strength properties.

Another object of the present invention is to provide highly effective de-inking compositions and additives to be used in the flotation de-inking process according to the present invention.

A further object of the present invention is to provide de-inking solutions and baths to be used in the flotation de-inking process according to the present invention.

Still another object of the present invention is to provide a reclaimed paper material of improved degree of whiteness and satisfactory strength properties.

Other objects of the present invention and advantageous features thereof will become apparent as the description proceeds.

Surprisingly it has been found that all the difficulties encountered when carrying out the known flotation de-inking processes are avoided according to the present invention by replacing most or all of the waterglass in the flotation de-inking compositions by phosphonic acids or by mixtures of such phosphonic acids with poly-and/or hydroxy-carboxylic acids, like gluconic acid, amino carboxylic acids, like EDTA, orthophosphates, like trisodiumphosphate, ethoxylates, sulfonated ethoxylates, like nonylphenylethoxylate (5-10 mol EO) or alkylethoxylates (5-10 mol EO), and/or magnesium sulfate.

In principle the phosphonic acid compounds according to the present invention correspond to the following general Formula

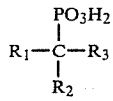

In said Formula $R_1$ indicates the following substituents:
  Hydrogen,
  methyl —$CH_3$,
  hydroxy methylene —$CH_2OH$,
  amino —$NH_2$,
  alkylene —$(CH_2)_n$—$CH_3$,
  alkylene carboxylic acid —$(CH_2)_n$—COOH,
  or a group of the following Formula

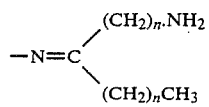

$R_2$ indicates the following substituents:
  Hydrogen,
  hydroxyl —OH,
  the phosphonic acid group —$PO_3H_2$,
  the alkylene carboxylic acid group —$(CH_2)_n$—COOH,
  or a group of the following Formulas

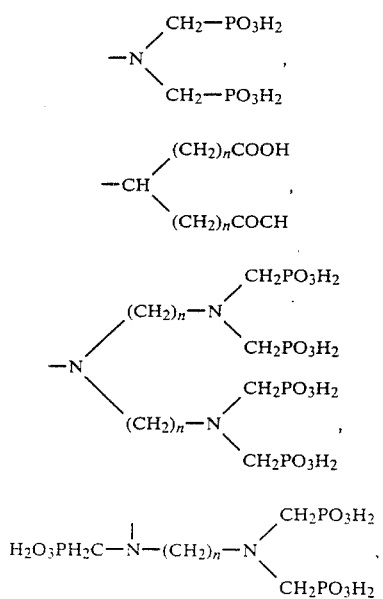

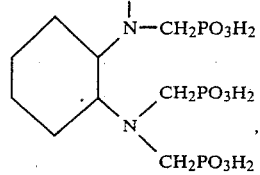

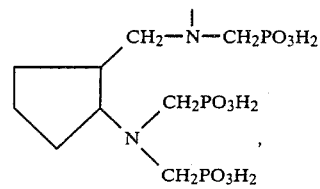

$R_3$ indicates the following substituents:
  Hydrogen,
  hydroxyl —OH,
  amino —$NH_2$,
  methyl —$CH_3$,
  alkylene —$(CH_2)_n$—$CH_3$,
  alkylene carboxylic acid —$(CH_2)_n$—COOH,
  or a group of the Formulas

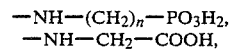

wherein
n indicates one of the numerals 1 to 6.

Preferred phosphonic acid compounds according to the present invention are the following compounds:
Ethylene diamine tetramethylene phosphonic acid,
di-ethylene tri-amine pentamethylene phosphonic acid,
N,N-dicarboxy methane-1-amino ethane-1,1-1 -diphosphonic acid,
1,2,4-tricarboxy butane-2-phosphonic acid,
hexamethylene diamine tetramethylene phosphonic acid,
1-hydroxy ethane-1,1-diphosphonic acid,
amino tris-methylene phosphonic acid,
1-amino ethane-1,1-diphosphonic acid,
N,N-bis-(hydroxy methyl)-1-amino ethane-1,1-diphosphonic acid,
N-(2-carboxy ethyl)-1-amino ethane-1,1-diphosphonic acid,
2-carboxy ethane phosphonic acid,
amino methane diphosphonic acid,
N,N-bis-(sulfo methyl)-1-amino ethane-1,1-diphosphonic acid.

The alkali metal salts of said phosphonic acid compounds and especially their potassium, sodium, and ammonium salts can also be added, as well as mixtures of the phosphonic acid compounds and their salts.

As stated above, these phosphonic acid compounds can preferably be used in mixture with hydroxy carboxylic acids, amino carboxylic acids, orthophosphates, ethoxylated compounds, sulfonated ethoxylated compounds, and/or magnesium sulfate.

The phosphonic acid compounds may be in an amount between about 0.02 weight percent and 2.0 weight percent based upon the amount of waste paper.

When adding the above mentioned phosphonic acid compounds, preferably together with the other above mentioned additives, to the flotation de-inking baths according to the present invention, it is possible to considerably reduce or even completely eliminate the addition of further complex compound-forming agents, such as, for instance, ethylene diamine tetra-acetic acid, as well as the addition of fatty acids, and thus to achieve noteworthy savings. Furthermore an increase in the degree of whiteness is observed.

The novel de-inking aids according to the present invention can be added depending upon the type of de-inking procedure used, to the detaching pulper, to the paper stock pulper, or to the pulper containing and operating with chemicals.

The de-inked reclaimed paper obtained by the process according to the present invention can be used for newspaper print, for tissue and other hygienic papers as well as for typewriter, printing, and writing paper.

DESCRIPTION OF THE PREFERRED EMBODIMENTS

The following examples serve to illustrate the present invention without, however, limiting the same thereto.

EXAMPLE 1

200 g. of a waste paper mixture consisting of
   100 g. of daily newspapers and
   100 g. of magazines
are beaten for 5 minutes, whereby the pulp density is about 4%.

The temperature is kept at about 50° C. During beating, the following chemicals are measured out and added to the paper pulp in amounts calculated for the waste paper charge:
5.0%, by weight, of sodium waterglass (37/40° Bé),
0.3%, by weight, of di-ethylene tri-amine penta-acetic acid,
2.0%, by weight, of hydrogen peroxide (30%),
2.0%, by weight, of sodium hydroxide,
1.0%, by weight, of soap, and
0.1%, by weight, of iso-tridecanol polyglycol ether.15 EO The resulting pulp has a pH-value of 8.5. The pulp has a swelling time of 30 minutes. The paper pulp is then diluted to a density of 0.8%, by weight, by the addition of water of 25° German hardness and is caused to flotate in a Voith flotation device (Firm: VOITH of Heidenheim, Fed. Rep. of Germany) for 15 minutes or, respectively, for 30 minutes. After acidifying the de-inked paper pulp to a pH-value of 5.0 by the addition of aluminium sulfate, test paper sheets are produced on a sheet forming device.

The following degrees of whiteness of the test sheets are determined by means of an appropriate testing device:

| Duration of de-inking process: | Degree of whiteness: |
|---|---|
| 15 minutes | 51.3 |
| 30 minutes | 53.6 |

The degree of whiteness of the border strips amounts to 62.3.

EXAMPLE 2

The procedure is the same as described in Example 1. However, in Example 2, 5%, by weight, of sodium waterglass and 0.3%, by weight, of di-ethylene tri-amine penta-acetic acid are replaced by
0.1%, by weight, of a mixture of
   80 parts of 1,2,4-tricarboxy butane-2-phosphonic acid,
   20 parts of di-ethylene tri-amine pentamethylene phosphonic acid.
Test sheets show the following degree of whiteness values:

| Duration of de-inking process: | Degree of whiteness: |
|---|---|
| 15 minutes | 56.4 |
| 30 minutes | 58.9 |

EXAMPLE 3

The procedure is the same as described in Example 1. However, 5%, by weight, of sodium waterglass and 0.3%, by weight, of di-ethylene tri-amine penta-acetic acid are replaced by
0.2%, by weight, of a mixture of
   40 parts of 1,2,4-tricarboxy butane-2-phosphonic acid,
   10 parts of di-ethylene tri-amine pentamethylene phosphonic acid,
   4 parts of trisodium phosphate, and
   46 parts of water.

| Duration of de-inking process: | Degree of whiteness: |
|---|---|
| 15 minutes | 58.4 |
| 30 minutes | 61.0 |

EXAMPLE 4

The procedure is the same as described in Example 1. However, 5% by weight, of sodium waterglass and 0.3% by weight, of di-ethylene tri-amine penta-acetic acid are replaced by
0.2%, by weight, of a mixture of
   40 parts of 1,2,4-tricarboxy butane-2-phosphonic acid,
   10 parts of N,N-dicarboxy methane-1-amino ethane-1,1-di-phosphonic acid,
   4 parts of trisodium phosphate, and
   46 parts of water.

| Duration of de-inking process: | Degree of whiteness: |
|---|---|
| 15 minutes | 59.1 |
| 30 minutes | 61.2 |

EXAMPLE 5

The procedure is the same as described in Example 1. However, 5%, by weight, of sodium waterglass and 0.3%, by weight, of di-ethylene tri-amine penta-acetic acid are replaced by
0.2%, by weight, of a mixture of
   18 parts of 1,2,4-tricarboxy butane-2-phosphonic acid,
   10 parts of N,N-dicarboxy methane-1-amino ethane-1,1-di-phosphonic acid, 2 parts of magnesium oxide or, respectively, magnesium sulfate, and
70 parts of water.

| Duration of de-inking process: | Degree of whiteness: |
|---|---|
| 15 minutes | 59.3 |
| 30 minutes | 60.7 |

EXAMPLE 6

The procedure is the same as described in Example 1. However, 5%, by weight, of sodium waterglass and 0.3%, by weight, of di-ethylene triamine penta-acetic acid are replaced by
0.5%, by weight, of a mixture of
  12.5 parts of N,N-dicarboxy methane-1-amino ethane-1,1-di-phosphonic acid,
  16.0 parts of ethylene di-amine tetra-acetic acid,
  5.0 parts of magnesium sulfate ($MgSO_4.7\ H_2O$), and
  66.5 parts of water.

| Duration of de-inking process: | Degree of whiteness: |
|---|---|
| 15 minutes | 54.4 |
| 30 minutes | 54.8 |

EXAMPLE 7

The procedure is the same as described in Example 1. However, 5%, by weight, of sodium waterglass and 0.3%, by weight, of di-ethylene triamine penta-acetic acid are replaced by
0.2%, by weight, of a mixture of
  40 parts of di-ethylene triamine diphosphonic acid,
  10 parts of diethylene triamine pentamethylene phosphonic acid, and
  50 parts of water.

| Duration of the de-inking process: | Degree of whiteness: |
|---|---|
| 15 minutes | 56.4 |
| 30 minutes | 58.9 |

EXAMPLE 8

The procedure is the same as described in Example 1. However, 5%, by weight, of sodium waterglass and 0.3%, by weight, of di-ethylene triamine penta-acetic acid are replaced by
0.2%, by weight, of a mixture of
  40 parts of 1,2,4-tricarboxy butane-2-phosphonic acid,
  10 parts of N,N-carboxyethyl-1-amino alkane-1,1-diphosphonic acid, and
  50 parts of water.

| Duration of de-inking process: | Degree of whiteness: |
|---|---|
| 15 minutes | 53.8 |
| 30 minutes | 58.0 |

EXAMPLE 9

The procedure is the same as described in Example 1. However, 5%, by weight, of sodium waterglass and 0.3%, by weight, of di-ethylene triamine penta-acetic acid are replaced by
0.2%, by weight, of a mixture of
  40 parts of di-ethylene triamine pentamethylene phosphonic acid,
  10 parts of N,N-carboxyethylene-1-aminoethane-1,1-di-phosphonic acid, and
  50 parts of water.

| Duration of de-inking process: | Degree of whiteness: |
|---|---|
| 15 minutes | 54.0 |
| 30 minutes | 58.9 |

EXAMPLE 10

The procedure is the same as described in Example 1. However, 5%, by weight, of sodium waterglass and 0.3%, by weight, of di-ethylene triamine penta-acetic acid are replaced by
0.1%, by weight, of hydroxy-ethane diphosphonic acid.

| Duration of de-inking process: | Degree of whiteness: |
|---|---|
| 15 minutes | 46.2 |
| 30 minutes | 50.0 |

EXAMPLE 11

The procedure is the same as described in Example 1. However, 5%, by weight, of sodium waterglass and 0.3%, by weight, of di-ethylene triamine penta-acetic acid are replaced by
0.1%, by weight, of N,N-dicarboxymethylene-1-aminoethane-1,1-diphosphonic acid.

| Duration of de-inking process: | Degree of whiteness: |
|---|---|
| 15 minutes | 51.2 |
| 30 minutes | 53.7 |

EXAMPLE 12

The procedure is the same as described in Example 1. However, 5%, by weight, of sodium waterglass and 0.3%, by weight, of di-ethylene triamine penta-acetic acid are replaced by
0.1%, by weight, of 1,2,4-tricarboxy butane-2-phosphonic acid.

| Duration of de-inking: | Degree of whiteness: |
|---|---|
| 15 minutes | 49.0 |
| 30 minutes | 53.3 |

EXAMPLE 13

The procedure is the same as described in Example 1. However, 5%, by weight, of sodium waterglass and 0.3%, by weight, of di-ethylene triamine penta-acetic acid are replaced by
0.1%, by weight, of di-ethylene triamine pentamethylene phosphonic acid.

| Duration of de-inking process: | Degree of whiteness: |
|---|---|
| 15 minutes | 56.4 |
| 30 minutes | 59.3 |

EXAMPLE 14

The procedure is the same as described in Example 1. However, 5%, by weight, of sodium waterglass and 0.3%, by weight, of di-ethylene triamine penta-acetic acid are replaced by 0.1%, by weight, of N,N-carboxy ethyle-1-aminoethane-1,1-diphosphonic acid.

| Duration of de-inking process: | Degree of whiteness: |
|---|---|
| 15 minutes | 54.5 |
| 30 minutes | 55.7 |

Of course, other phosphonic acid compounds than those added according to the preceding Examples 2 to 14 can also be used as they are mentioned hereinabove and claimed hereinafter. Furthermore, the composition of the de-inking solutions, the amounts and concentration of its ingredients, the de-inking temperature and duration, the manner in which the paper pulps are worked up to the various types of reclaimed paper, and the like, may be varied in accordance with the principles set forth herein and in the claims annexed hereto.

What is claimed is:

1. A process for de-inking paper by the flotation de-inking process comprising the steps of:
   forming waste paper into a paper pulp; and
   subjecting said paper pulp to a de-inking composition, comprising:
   a substance selected from the group consisting of sodium hydroxide, sodium peroxide, a combination of sodium hydroxide and sodium peroxide, and hydrogen peroxide; and
   a mixture of 1,2,4-tricarboxy butane-2-phosphonic acid, and an amino alkane phosphonic acid; the proportion of 1,2,4-tricarboxy butane-2-phosphonic acid to amino alkane phosphonic acid in said de-inking composition being in the range from about 4:1 to 1:4, and the phosphonic acid mixture being present in an amount between about 0.02 weight percent and 2.0 weight percent based upon the amount of waste paper.

2. A process according to claim 1, wherein said de-inking composition further comprises trisodium phosphate.

3. A process according to claim 1, wherein said de-inking composition further comprises an inorganic magnesium compound.

4. A process according to claim 1, wherein said de-inking composition further comprises iso-tridecanol polyglycol ether as a wetting agent.

* * * * *